United States Patent
Hutchinson et al.

(10) Patent No.: US 6,539,977 B1
(45) Date of Patent: Apr. 1, 2003

(54) SELF DRAINING ORIFICE FOR PNEUMATIC LINES

(75) Inventors: Rick Neil Hutchinson, Cincinnati, OH (US); Robert David Wittenbach, Lebanon, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/671,000

(22) Filed: Sep. 27, 2000

(51) Int. Cl.[7] ................................................. F15D 1/02
(52) U.S. Cl. .......................... 138/44; 138/40; 60/309; 285/14; 415/168.1; 415/169.2
(58) Field of Search ........................ 138/40, 44; 60/309, 60/39.07; 415/168.1, 169.2; 285/14

(56) References Cited

U.S. PATENT DOCUMENTS

| | | | |
|---|---|---|---|
| 1,216,815 A | * 2/1917 | Kelly | 138/44 |
| 1,802,766 A | * 4/1931 | Kerr | 138/44 |
| 1,803,126 A | * 4/1931 | Oberhuber | 138/40 |
| 2,456,626 A | * 12/1948 | Dahnke | 138/44 |
| 3,145,529 A | * 8/1964 | Maloof | 138/44 |
| 4,234,008 A | * 11/1980 | Cronfel | 138/44 |
| 4,424,989 A | 1/1984 | Spencer et al. | |
| 5,060,686 A | * 10/1991 | Troy | 138/44 |
| 5,085,058 A | * 2/1992 | Aaron et al. | 138/44 |
| 5,259,185 A | * 11/1993 | Peterson | 60/39.094 |
| 5,529,244 A | * 6/1996 | Horvath, Jr. et al. | 138/44 |
| 5,632,242 A | * 5/1997 | Harde | 138/44 |
| 5,647,201 A | * 7/1997 | Hook et al. | 60/258 |
| 6,000,433 A | * 12/1999 | Carroll et al. | 138/44 |
| 6,035,897 A | * 3/2000 | Kozyuk | 138/44 |
| 6,276,397 B1 | * 8/2001 | Weber et al. | 138/44 |

* cited by examiner

*Primary Examiner*—James Hook
(74) *Attorney, Agent, or Firm*—Nathan D. Herkamp; Pierce Atwood

(57) ABSTRACT

Drainage is enhanced in an orifice formed inside the internal passage of a pneumatic line by providing the orifice with first and second portions. The first portion defines a diameter that is smaller than the diameter of the internal passage, and the second portion defines a progressively increasing diameter. Generally, a first end of the second portion has a diameter that is equal to the first portion diameter, and a second end of the second portion has a diameter that is equal to the internal passage diameter.

15 Claims, 2 Drawing Sheets

SELF DRAINING ORIFICE FOR PNEUMATIC LINES

BACKGROUND OF THE INVENTION

This invention relates generally to pneumatic lines and more particularly to pneumatic lines used in gas turbine engines.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work. An engine controller controls the amount of fuel that is supplied to the combustor. The engine controller monitors certain engine parameters to determine how much fuel should be provided. One of these parameters is the compressor discharge pressure (CDP), which provides an indication of how much compressed air is entering the combustor. The engine controller monitors the compressor discharge pressure by means of a pneumatic line referred to as the CDP line.

The CDP line directly carries compressed air from the compressor to the engine controller and thus provides a direct indication of the airflow of the compressor for use by the engine controller. Because the compressed air is derived from ambient air, it will contain varying amounts of water in vaporized form. Temperature and pressure changes often cause these water vapors to condense on the inside walls of the CDP line, and if large amounts of water condense, a substantial body of freestanding water can form inside the CDP line.

In a typical gas turbine engine, freestanding water could present difficulties in engine operation. Gas turbine engines are often exposed to subfreezing temperatures. The freestanding water could freeze in these conditions and block the CDP line, placing the engine at risk for a loss of thrust control event. To prevent such blockage, CDP lines have been provided with small, round drain holes at a low point in the line. When the CDP line carries pressurized air, the air blowing out of the drain hole effectively discharges excess water.

To prevent unacceptable losses of pressurized air, the drain holes are purposely made with a relatively small diameter. This, unfortunately, leads to problems when the engine is not in operation and the air in the CDP line is not pressurized. Compressed air will not blow out of the hole and, therefore, only the force of gravity will work to discharge water through the drain hole. However, surface tension of the water across the drain hole can actually support significant amounts of water inside the CDP line. It has been found that with no pressure differential across it, a 0.02 inch (0.0508 cm) diameter drain hole orifice will typically retain about 0.5 inches (1.27 cm) of water above it. This might be enough to plug the drain hole in the event that the water freezes.

To avoid this potential problem, U.S. Pat. No. 4,424,989, issued Jan. 10, 1984 to William R. Spencer et al., discloses a drain hole construction that prevents surface tension from supporting significant amounts of free-standing water in the drain hole. This drain hole construction comprises a divergent enlargement at the outer opening of the drain hole that prevents surface tension from inducing a build up of water inside the line.

However, CDP lines typically include internal features that can retain condensed water inside the CDP line and prevent it from draining to the drain holes. For instance, CDP lines are often designed with an in-line restrictor orifice that will limit gas discharge in the event that the line breaks upstream of the orifice. Because the restrictor orifice presents a greatly reduced diameter, water might not totally drain past the restrictor orifice. In cold conditions, this water could freeze and plug the orifice and the CDP line. Another feature that has been known to internally retain water is the manifold that connects the CDP line to the engine controller. The manifold presents sharp-edged reductions in diameters that can retain water. If this water were to freeze, it could also prevent the CDP signal from being delivered to the engine controller.

Accordingly, it would be desirable to have a pneumatic line in which water is allowed to freely drain within the line so as to be able to drain out of the line via the drain hole.

BRIEF SUMMARY OF THE INVENTION

The above-mentioned need is met by the present invention, which provides an orifice formed inside the internal passage of a pneumatic line. To enhance drainage past the orifice, it comprises a first portion defining a diameter that is smaller than the diameter of the internal passage and a second portion that defines a progressively increasing diameter. Generally, a first end of the second portion has a diameter that is equal to the first portion diameter, and a second end of the second portion has a diameter that is equal to the internal passage diameter.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
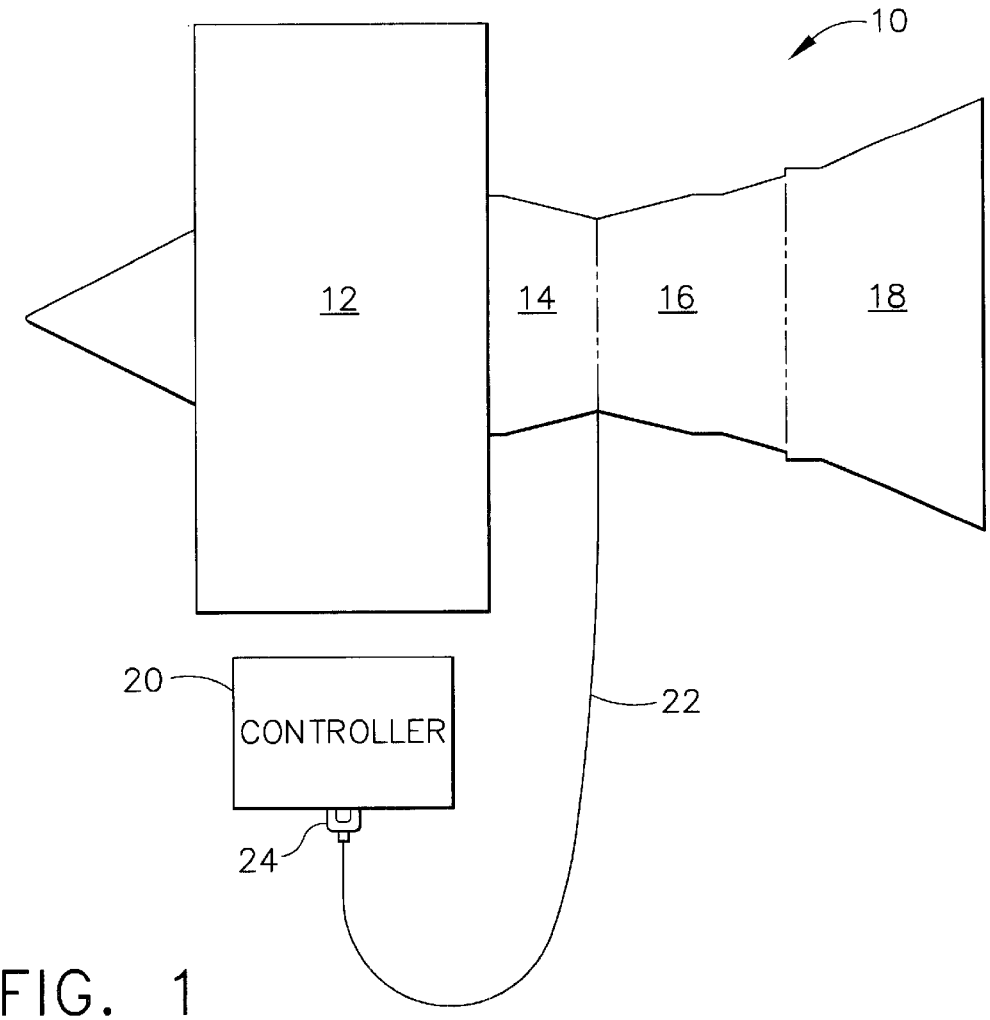
FIG. 1 is a schematic view of a gas turbine engine having a pneumatic line.

Referring to the drawings wherein identical reference numerals denote the same elements throughout the various views, FIG. 1 shows an exemplary turbofan gas turbine engine 10. While it is recognized that turbofan engines in general are well known in the art, a brief description of the overall configuration of the engine 10 and the interrelationship of its various components will enhance understanding of the invention to be described below. Furthermore, it should be pointed out that a turbofan engine is used only as an example; the present invention is not limited to turbofan engines and can be applied to pneumatic lines used in many other applications.

The engine 10 includes, in serial axial flow communication about a longitudinal centerline axis, a fan section 12, a compressor section 14, a combustor section 16, and a turbine section 18. During engine operation, ambient air enters the engine inlet and a first portion of the ambient air, typically referred to as the primary gas stream, passes through the fan section 12 and then the compressor section 14, being pressurized by each section in succession. The primary gas stream then enters the combustor section 16 where the pressurized air is mixed with fuel and burned to provide a high energy stream of hot combustion gases. The high energy gas stream passes through the turbine section 18. As is known in the art, the turbine section 18 includes a high pressure turbine and a low pressure turbine. The high energy gas stream is first expanded in the high pressure turbine, with energy extracted to drive the compressor section 18. The high energy gas stream is then further expanded in the low pressure turbine, with energy being extracted to drive the fan section 12. A second portion of the ambient air, typically referred to as the secondary or bypass airflow, passes through the fan section 12 but bypasses the compressor section 14. The secondary airflow, which is pressurized by the fan section 12, exits the engine 10 and provides a significant portion of the engine thrust.

An engine controller 20 (shown schematically in FIG. 1) is provided to control the engine 10 throughout its various modes of operation. Among other things, the controller 20 controls the amount of fuel that is directed into the combustor section 16 for fueling the combustion process. The engine controller 20 monitors certain engine parameters to determine how much fuel should be provided. One of these parameters is the compressor discharge pressure (CDP). This pressure provides an indication of how much compressed air is entering the combustor section 16 and is monitored by the engine controller 20 to determine the amount of fuel needed for the desired air-fuel mixture. Thus, one of the primary functions of the engine controller 20 is to use a CDP signal to produce the appropriate air-fuel mixture.

The engine 10 includes a pneumatic line 22, referred to as the CDP line. The CDP line 22 is a tube or pipe having an internal passage that directly carries compressed air from the discharge of the compressor section 14 to the engine controller 20, thereby providing the CDP signal. Although the engine controller 20 is shown schematically in FIG. 1, it is ordinarily located in the fan section 12. Thus, the CDP line 22 extends from the compressor section 14 to the fan section 12. The CDP line 22 includes a manifold 24 for connection to the engine controller 20.

The controller 20 uses this CDP signal, in conjunction with other indications of engine parameters, to generate a command signal that is fed to a conventional hydromechanical unit (not shown). In response, the hydromechanical unit meters the flow of fuel to the combustor section 16. To maintain an unrestricted flowpath through the CDP line 22 so that the engine controller 20 obtains an accurate indication of compressor pressure, the CDP line 22 includes one or more drain holes (not shown in FIG. 1). The drain holes, which are known in the art, provide a means for water that condenses inside the CDP line 22 to be drained therefrom.

Figure 2:
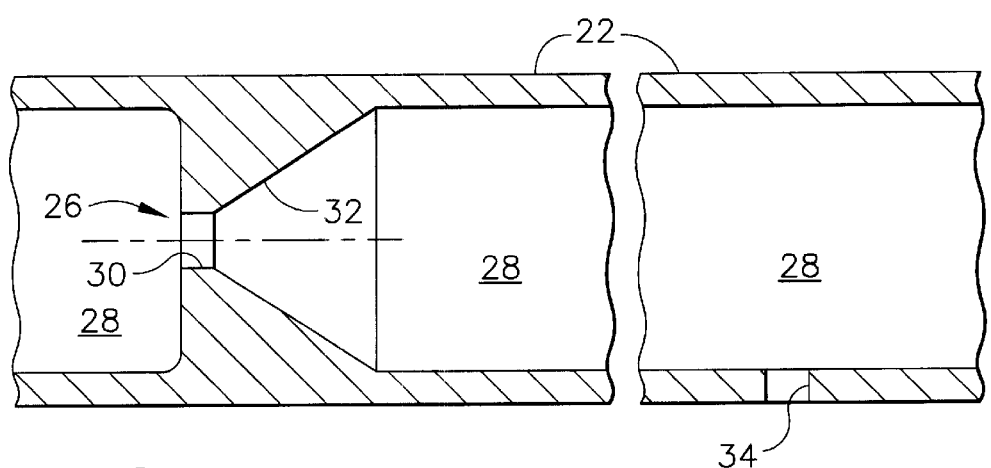
FIG. 2 is a sectional view of the pneumatic line of FIG. 1 showing an internal restrictor orifice.

Referring now to FIG. 2, a portion of the CDP line 22 is shown in cross-section to reveal a restrictor orifice 26 formed inside the internal passage 28 thereof. The restrictor orifice 26 is typically located in the CDP line 22 so as to be at the transition of the fan and compressor sections. Thus, in the event of a failure (such as a fatigue break or the like) of the portion of the CDP line 22 located in the fan section 12, the restrictor orifice 26 will minimize the volume of hot CDP air that is blown into the fan section 12.

The restrictor orifice 26 is oriented generally coaxially with the internal passage 28 of the CDP line 22 and comprises first and second portions 30, 32. The first portion 30 defines a relatively small, round opening having a generally constant diameter that is substantially smaller than the diameter of the internal passage 28. Thus, the first portion 30 presents a reduced cross-sectional area that minimizes compressed air discharge in the event the CDP line 22 breaks. In one embodiment, the diameter of the first portion 30 is approximately 0.08 inches (0.20 cm). While a round opening is generally preferable, it is possible that other shapes might also be used.

The second portion 32 defines an opening having a diameter that progressively increases as the second portion 32 extends from the first portion 30. Specifically, the end of second portion 32 that is adjacent to the first portion 30 has a diameter that is substantially equal to the first portion diameter, and the other end of the second portion 32 has a diameter that is substantially equal to the diameter of the internal passage 28. Accordingly, the second end of the second portion 32 presents a larger cross-sectional area than the first end. By providing an increasing cross-sectional area, the second portion 32 forces surface tension to extend over a larger area. This has the effect of diminishing the amount of water that can be supported above the restrictor orifice 26 by surface tension. Accordingly, water will be allowed to freely drain past the restrictor orifice 26.

As shown in FIG. 2, the diameter of the second portion 32 continuously expands throughout the opening such that the opening has a conical shape. To promote water drainage without enhancing airflow, the conical opening of the second portion 32 preferably, but not necessarily, defines an included angle in the range of 60–90 degrees. It should be noted that the shape of the second portion 32 need not necessarily be conical. The second portion 32 can take any of a number of shapes as long as it defines a progressively increasing cross-sectional area so that surface tension cannot retain water at the restrictor orifice 26.

The restrictor orifice 26 is oriented within the CDP line 22 such that of the two portions 30, 32, the second portion 32 is closest to or facing a drain hole 34, which is formed in a low point in the CDP line 22. In operation, any water that condenses in the portion of the CDP line 22 above the restrictor orifice 26 (i.e., the portion of the CDP line 22 that is on the side of the orifice 26 opposite from the drain hole 34) will flow to the first portion 30 under the force of gravity. The water will initially tend to collect in the first portion 30 due to surface tension at the reduced diameter. At the second portion 32, the water is attracted to the inner surface thereof in the manner of a capillary tube, drawing the water into the conical opening. As the water progresses into the conical opening, the weight of water in the conical opening increases more rapidly than the supporting surface tension force until the pressure force, due to the weight of water, exceeds the surface tension force allowing a drop to separate and drain past the restrictor orifice 26. This water is then free to flow to the drain hole 34, where it can drain out of the CDP line 22.

Figure 3:
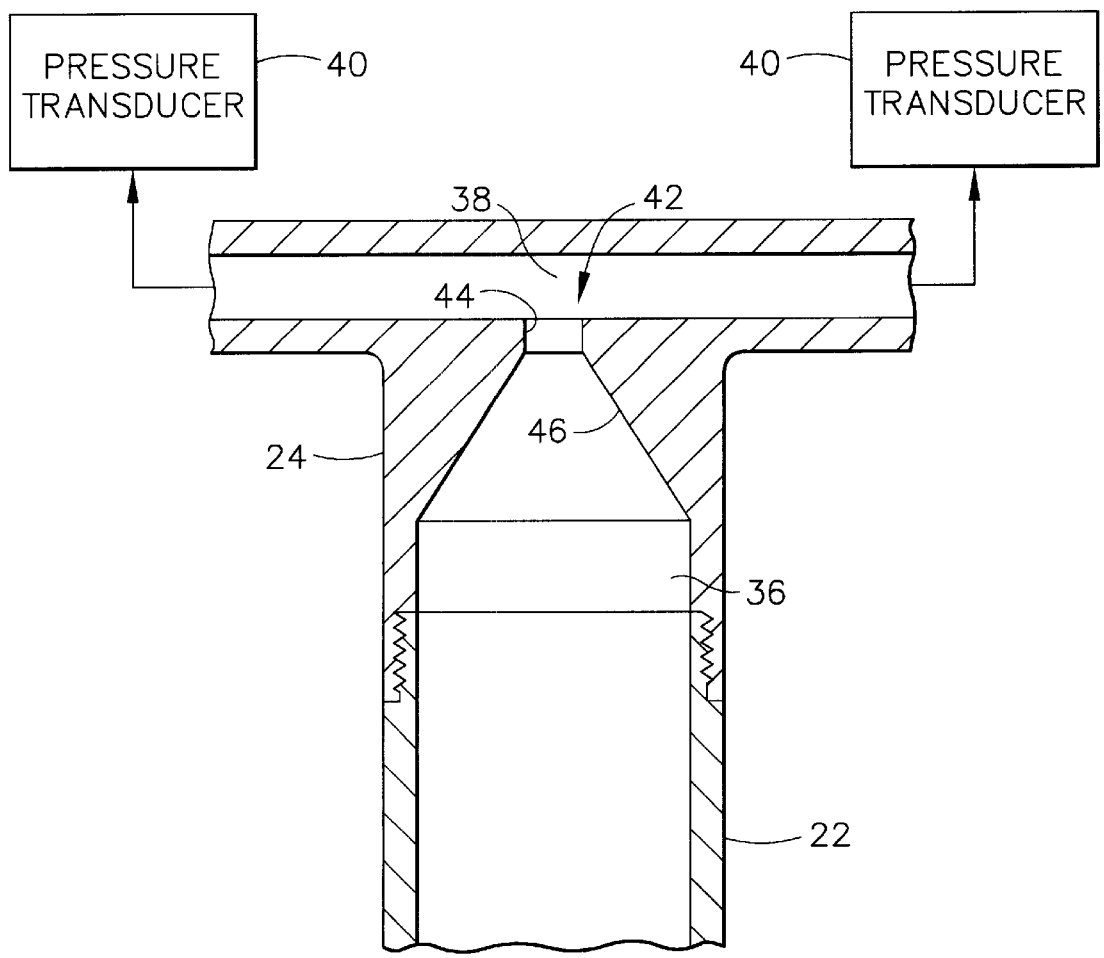
FIG. 3 is a sectional view of a manifold for connecting the pneumatic line of FIG. 1.

The present invention can be applied to other types of reduced diameter orifices or restrictions found in the CDP line 22. For instance, FIG. 3 shows the manifold 24, which connects the CDP line 22 to the engine controller 20. The manifold 24 includes a pressure port 36, to which the main portion of the CDP line 22 is coupled and a pressure passage 38 for carrying compressed air to a pair of pressure transducers 40 in the engine controller 20. Two pressure transducers 40 are used to provide two channels for redundancy purposes. A reduced diameter orifice 42 provides fluid communication between the pressure port 36 and the pressure passage 38.

Like the restrictor orifice 26, the manifold orifice 42 comprises first and second portions 44, 46. The first portion 44 defines a relatively small, round opening having a generally constant diameter that is substantially smaller than the diameter of the internal passage 28. The second portion 46 defines an opening having a diameter that progressively increases as the second portion 46 extends from the first portion 44. Specifically, the end of second portion 46 that is adjacent to the first portion 44 has a diameter that is substantially equal to the first portion diameter, and the other end of the second portion 46 has a diameter that is substantially equal to the diameter of the internal passage 28. Accordingly, the second end of the second portion 46 presents a larger cross-sectional area than the first end. By providing an increasing cross-sectional area, the second portion 46 forces surface tension to extend over a larger area, thereby enhancing drainage in the same manner described above. Thus, any water condensing in the pressure passage 38 free to flow to the CDP line drain hole 34, where it can drain out of the CDP line 22.

The foregoing has described an orifice for a pneumatic line that allows water or other liquids to freely drain within the line so as to be able to drain out of the line via a drain hole. It should be noted that as used herein, the term "orifice" refers to not only the types of orifices shown and described above, but to any type of restriction formed in a flow conduit. Furthermore, the present invention is not limited to CDP lines and can be used with other pneumatic lines.

While specific embodiments of the present invention have been described, it will be apparent to those skilled in the art that various modifications thereto can be made without departing from the spirit and scope of the invention as defined in the appended claims.

What is claimed is:

1. A compressor discharge pressure line for a gas turbine engine, comprising:
   a tube having an internal passage defining a diameter, and an orifice formed inside said internal passage, said orifice comprising:
      a first portion defining a diameter that is smaller than said internal passage diameter; and
      a second portion having first and second ends, said first end being adjacent to said first portion, wherein said second portion defines a progressively increasing diameter that is equal to said first portion diameter at said first end and equal to said internal passage diameter at said second end; and
   a drain hole disposed in said tube downstream of said orifice.

2. The compressor discharge pressure line of claim 1 wherein said second portion of said orifice defines a conical opening.

3. The compressor discharge pressure line of claim 1 wherein said orifice is oriented coaxially with said internal passage.

4. The compressor discharge pressure line of claim 1 wherein said orifice is a restrictor orifice that limits air discharge from a break in said compressor discharge pressure line.

5. A pneumatic line for a gas turbine engine, comprising:
   a tube having a first end, a second end, an internal passage defining a diameter, a drain hole disposed in said tube at a location lower than said first and second ends, and an orifice formed inside said internal passage, said orifice comprising:
      a first portion defining a diameter that is smaller than said internal passage diameter; and
      a second portion having first and second ends, said first end being adjacent to said first portion, wherein said second portion defines a progressively increasing diameter that is equal to said first portion diameter at said first end and equal to said internal passage diameter at said second end, wherein said orifice is disposed between said first end of said tube and said drain hole, and said second portion of said orifice faces said drain hole.

6. The pneumatic line of claim 5 further comprising a second orifice formed at said second end of said pneumatic line, said second orifice including:
   a first portion defining a diameter that is smaller than said internal passage diameter; and
   a second portion having first and second ends, said first end being adjacent to said first portion, wherein said second portion defines a progressively increasing diameter that is equal to said first portion diameter at said first end and equal to said internal passage diameter at said second end, wherein said second portion of said second orifice faces said drain hole.

7. The pneumatic line of claim 5 wherein said second portion of said orifice defines a conical opening.

8. The pneumatic line of claim 5 wherein said orifice is oriented coaxially with said internal passage.

9. The pneumatic line of claim 5 wherein said orifice is a restrictor orifice that limits air discharge from a break in said pneumatic line.

10. A pneumatic line for a gas turbine engine, comprising:
    a tube having a first end connected to a source of pressurized air in said engine, a second end connected to ah engine controller, an internal passage defining a diameter, a drain hole disposed in said tube at a location lower than said first and second ends, and an orifice formed inside said internal passage, said orifice comprising:
       a first portion defining a diameter that is smaller than said internal passage diameter; and
       a second portion having first and second ends, said first end being adjacent to said first portion, wherein said second portion defines a progressively increasing diameter that is equal to said first portion diameter at said first end and equal to said internal passage diameter at said second end, wherein said orifice is disposed between said first end and said drain hole, and said second portion of said orifice faces said drain hole.

11. The pneumatic line of claim 10 further comprising a second orifice formed at said second end of said tube, said second orifice including:
    a first portion defining a diameter that is smaller than said internal passage diameter; and
    a second portion having first and second ends, said first end being adjacent to said first portion, wherein said second portion defines a progressively increasing diameter that is equal to said first portion diameter at said first end and equal to said internal passage diameter at said second end, wherein said second portion of said second orifice faces said drain hole.

12. The pneumatic line of claim 11, wherein a manifold is disposed between said second end of said tube and said control unit.

13. The pneumatic line of claim 11 wherein said second portion of said orifice defines a conical opening.

14. The pneumatic line of claim 11, wherein said orifice is oriented coaxially with said internal passage.

15. The pneumatic line of claim 11 wherein said orifice is a restrictor orifice that limits air discharge from a break in said pneumatic line.

* * * * *